United States Patent
Albo

[11] Patent Number: 5,973,635
[45] Date of Patent: Oct. 26, 1999

[54] ENHANCED MICROBURST DETECTION SYSTEM

[75] Inventor: Eugene David Albo, Boulder, Colo.

[73] Assignee: University Corporation for Atmospheric Research, Boulder, Colo.

[21] Appl. No.: 09/117,326

[22] PCT Filed: Jan. 29, 1997

[86] PCT No.: PCT/US97/01389

§ 371 Date: Jul. 27, 1998

§ 102(e) Date: Jul. 27, 1998

[87] PCT Pub. No.: WO97/28460

PCT Pub. Date: Aug. 7, 1997

Related U.S. Application Data

[63] Continuation-in-part of application No. 08/539,014, Oct. 3, 1995, Pat. No. 5,648,782
[60] Provisional application No. 60/010,867, Jan. 31, 1996.

[51] Int. Cl.[6] .................................................... G01S 13/95
[52] U.S. Cl. ............................................................. 342/26
[58] Field of Search .................................. 342/26; 702/3; 706/931

[56] References Cited

U.S. PATENT DOCUMENTS

| | | |
|---|---|---|
| 5,130,712 | 7/1992 | Rubin et al. ............................... 342/26 |
| 5,247,303 | 9/1993 | Cornelius et al. ......................... 342/26 |
| 5,311,183 | 5/1994 | Mathews .................................... 342/26 |
| 5,648,782 | 7/1997 | Albo .......................................... 342/26 |

*Primary Examiner*—Daniel T. Pihulic
*Attorney, Agent, or Firm*—Duft, Graziano & Forest, P.C.

[57] ABSTRACT

A weather radar system (21) utilizing enhanced fuzzy logic processing (300) to detect atmospheric microburst events. In addition to the wind shear likelihood (250), low level surface reflectivity likelihood (252), and clutter likelihood (254) used by existing fuzzy logic based microburst detection systems to generate a combined microburst likelihood, one enhancement includes using reflectivity measurements of high level storm activity to generate an independent high level aloft reflectivity likelihood image (310) that corresponds to and confirms the findings of the low level surface reflectivity likelihood (252). Another enhancement includes using a series of combined likelihoods saved over time (635) for N successive scans of the weather radar system (21) to generate a history likelihood (620) that eliminates spurious detections from one scan to the next. Another enhancement includes generating a microburst strength determination (330) based on the wind speed loss an aircraft would experience when flying through a microburst.

18 Claims, 6 Drawing Sheets

ENHANCED MICROBURST DETECTION SYSTEM

CROSS REFERENCE TO RELATED APPLICATIONS

This application is a continuation-in-part of copending U.S. patent application Ser. No. 08/539,014 titled "Microburst Detection System" filed Oct. 3, 1995, now U.S. Pat. No. 5,648,782, the text of which is incorporated herein by reference to the same extent as if the actual text were set forth herein. The Applicant is entitled to and claims the benefit of priority based on United States provisional application for patent Ser. No. 60/010,867 titled "Enhanced Microburst Detection System" filed on Jan. 31, 1996, the text of which is incorporated herein by reference to the same extent as if the actual text were set forth herein.

GOVERNMENT FUNDED INVENTION

This invention was made with Government support under Agreement No. ATM-9209181 awarded by the National Science Foundation. The Government has certain rights in this invention.

FIELD OF THE INVENTION

The present invention pertains to the field of devices that use radar to detect atmospheric conditions, and more particularly to the radar devices that use radio emissions to identify localized wind shear events that are known as microbursts.

PROBLEM

A microburst is a type of meteorological event that is characterized by localized low-altitude horizontal and/or vertical wind shears of about 0.0025/(m/s)/m or greater. For example, a microburst type of wind shear can have a wind speed difference of ten meters per second over a distance no greater than four kilometers.

Aircraft are particularly vulnerable to the affect of a microburst. Upon encountering a microburst, an aircraft can fall several hundred feet in altitude or a pilot can encounter severe difficulty in steering the aircraft. Thus, microburst dangers are particularly acute in regions around airports where airplanes travel close to the ground at lower speeds and often with full flaps and/or landing gear down. For these reasons microbursts are suspected as having contributed to numerous airplane crashes every year. However, the actual number of crashes that are caused by microbursts each year remains unknown because of the transitory and undetected nature of the microburst.

One significant problem exists in locating a microburst because they are often invisible to the naked eye due to the lack of dust and/or rain being carried by the microburst. Other wind shear events including, but not limited to, tornadoes and storm gust fronts are more easily avoided because they can be seen with the naked eye due to dust and/or rain being carried by the event. For this reason, reliable microburst detection requires the use of instrumentation that can expand the range of human perception.

Conventional microburst detection relies upon techniques that are similar to Terminal Doppler Weather Radar (TDWR). TDWR techniques identify interesting regions having high wind speed loss indicators, and then shape building techniques are used to clump the interesting regions into shapes and remove spurious points. However, TDWR only measures wind speed loss over the full extent of a windshear region which is different from a windshear measurement that is the rate of change of wind speed at a specific point or path. Thus, the TDWR lacks a direct connection to the F-factors that are well known aircraft safety indicators requiring wind shear data in their computation. Another problem is that TDWR lacks sensitivity to such conditions as low reflectivity that tend to hide microburst activity. Further, TDWR processing is a complex algorithm that requires a large number of adjustable parameters. For this reason, apparatus that incorporates the TDWR process is difficult to tune for accuracy in different localities. The failure to properly tune TDWR can result in false microburst indications that cause needless aircraft rerouting, or the failure to detect actual microburst activity thereby exposing aircraft to a potentially lethal risk.

The preferred state of the art microburst detection system utilizes mathematical modeling, fuzzy logic, and pattern recognition techniques to identify microburst activity more precisely than the existing systems outlined above. The accuracy of the preferred microburst detection system is realized by considering all available atmospheric and/or meteorological information before reaching a decision as to whether a point or points should be rejected as uninteresting relative to the likelihood of microburst activity. Basing microburst activity decisions on the consideration of all available atmospheric and/or meteorological information facilitates suppressing false microburst indicators that lead to false microburst detections by the existing systems outlined above and facilitates detecting microburst activity where a microburst would otherwise go undetected by the existing systems outlined above.

The preferred microburst detection system is defined using terms that are defined for clarity below. The term "image" means any graphical representation or map whether it is in visual, analog, or digital form. For example, an image can include a computer screen display projecting a three-dimensional image onto a two-dimensional space by coloring or shading the blocks of a two-dimensional polar coordinate grid system according to a likelihood value assigned to each block. The image also includes digital files incorporating the data that are used to create the computer screen display, wherein the third dimension likelihood value is mapped to its corresponding two-dimensional location.

The term "likelihood" is defined as an indicator of confidence in a certain value for the purpose to which it is being applied. A likelihood is not derived from a true probabilistic or statistical model. A likelihood is a value in the range from −1.0 to 1.0, with interpretation somewhat akin to probability. A likelihood of 1.0 indicates a very high confidence or likelihood that there could be a microburst. A likelihood value of 0.0 indicates no present knowledge in favor of or against the possibility of a microburst. A value of −1.0 represents a very strong indication that there could not be a microburst. Intermediate values between −1.0 and 1.0 indicate a variable level of confidence of the likelihood of a microburst.

A "likelihood image" is defined as a two-dimensional image, much like a radar scan, with likelihood values assigned independently at each point in the two-dimensional image. The set of values at each point in the two-dimensional field make up the likelihood image. Each likelihood image has a particular input field or fields used from which it is built. The input data used to generate a likelihood image is typically incoming radar data in a polar coordinate orientation with data sampling at a set of gates and azimuths. A likelihood image is sampled to the same gate/azimuth locations in polar coordinates to maintain the original data resolution throughout processing.

A "likelihood mapping" is defined as a function applied to each point in a two-dimensional input field of data such as a radar scan, which convert the input data to a likelihood image. Example input fields include, but are not limited to, radar radial velocity, reflectivity, wind shear estimates, clutter maps, and other likelihood images. The likelihood mapping that converts a particular input field into a likelihood image is dependent on the input and is customized to represent the intuitively expected effect of the particular image for or against a microburst detection.

The term "fuzzy logic" is defined as the logic of approximate reasoning used to iteratively quantify a likelihood. The fuzzy logic technique combines circumstantial evidence of a given weather event that is represented by a particular likelihood with additional evidence or lack of evidence that is found in other likelihood images, into a point by point weighted summation of likelihood values that generates a combined likelihood image that is itself a likelihood image. The choice of weight values is driven by the expected relative effect of the particular likelihood field on the overall likelihood of the phenomena. The weights can be chosen heuristically, or through use of automatic optimization methods such as neural network training techniques.

Existing state of the art microburst detection systems include a single Doppler radar station used to detect radar echos and produce signals that are representative of atmospheric and/or meteorological phenomena. The radar is connected to a processor that receives the representative signals for processing. The processor converts the signals into a plurality of microburst likelihood images that can include, but is not limited to, a wind field shear likelihood image, a clutter likelihood image, a reflectivity likelihood image, and recently detected microburst activity likelihood images.

For example, a likelihood image might represent relative wind shear values, with the image polar coordinate grid block elements independently assigned values in the range −1 to 1, with high values (close to 1.0) indicating regions of the image at which it is likely there could be a microburst. The polar grid coordinates are defined as respective areal elements that are further defined by an angle of the radar beam sweep in combination with a particular emission gate spacing. The polar coordinate system is preferably the same for each likelihood image. A set of weighting factors that each correspond to a given likelihood image are used as multipliers to weight the likelihood values of their corresponding likelihood images. The weighted likelihood values from each image are summed at each element of the polar grid system, and the combined total at each element is used to produce a combined likelihood image. The combined image is, in turn, used to detect microburst activity.

In preferred embodiments, the existing microburst detection systems emit radar at a resolution of up to or including five degrees per beam. Increasing the beam sweep tends to reduce the predictive qualities of a microburst detection system that includes the use of the fuzzy logic technique. The most preferred set of likelihood images includes a wind field shear likelihood image, a clutter likelihood image, and a reflectivity likelihood image. The weighting factors for these likelihood images are preferably found as having a ratio of about 9:4:2 determined as factors for wind field shear, clutter, and reflectivity respectively.

The combined likelihood image values are preferably subjected to an area delimiter test. An area delimiter is a circle having a radius ranging from one to two kilometers that is superposed over the combined likelihood image. The combined likelihood value of the grid coordinates underlying the center of the circle is replaced with an average or arithmetic mean likelihood value that is calculated from the elements that underlie the circle. This averaging process tends to smooth the combined likelihood image by enhancing those regions having high likelihoods of a greater areal extent than the area delimiter, and by normalizing downward those regions having a spuriously high likelihood of lesser areal extent than a true microburst. The result of the area delimiter test is defined as the smoothed likelihood image. Microburst activity regions are then identified as shapes having contiguous or continuously connected areas in the smoothed likelihood image that exceed a minimum threshold of likelihood value.

One problem with existing microburst detection systems is that they rely on a series of low level or surface radar scans that focus on a region of detectable microbursts that is about or less than 1 km above the Earth's surface. However, this limited elevational radar scan fails to consider the circumstantial evidence of storms aloft that are often associated with the origin of a microburst. Such storms aloft exist in a region from about 3–6 km above the Earth's surface.

Another problem with existing microburst detection systems is that they rely on likelihoods as they are determined for each real time scan of a radar. However, this limited temporal view of microburst activity fails to consider the circumstantial evidence of persistent microburst activity over time beyond the typical one minute radar scan and can reduce the potential response time to a microburst detection.

Another problem with existing microburst detection systems is that they are designed to identify only the presence of a microburst. However, information as to the intensity or strength of a microburst is not available.

For the above reasons, there exists a need for enhancements to existing microburst detection systems to increase the accuracy and ability for such systems to detect microburst activity. Such enhancements have heretofore not been conceived or disclosed prior to the detailed description set forth and claimed below.

SOLUTION

The above stated problems are solved and an advancement achieved in the field of fuzzy logic based microburst detection systems, by the enhanced microburst detection system of the present invention. The enhanced microburst detection system includes a weather radar system utilizing the fuzzy logic processing of existing microburst detection systems to detect atmospheric microburst events, in addition to added enhancements that improve the accuracy of true versus false microburst detections. The enhanced microburst detection system includes the wind shear likelihood image, low level surface reflectivity likelihood image, and clutter likelihood image used by existing fuzzy logic based microburst detection systems to generate a combined microburst likelihood image, in addition to one enhancement that uses reflectivity measurements of storm activity to generate an independent high level aloft reflectivity likelihood image that corresponds to and confirms the finding of the low level surface reflectivity likelihood image. Another enhancement includes saving a series of combined area delimited or smoothed likelihood images over time for N successive scans of the weather radar system, to generate a history likelihood image that is combined with the present combined smoothed likelihood image for the present radar scan to improve consistency in detections through time. Another enhancement includes generating a microburst strength determination based on the wind speed loss an aircraft would experience when flying through a microburst along any one of a plurality of paths.

DETAILED DESCRIPTION

Figure 1:
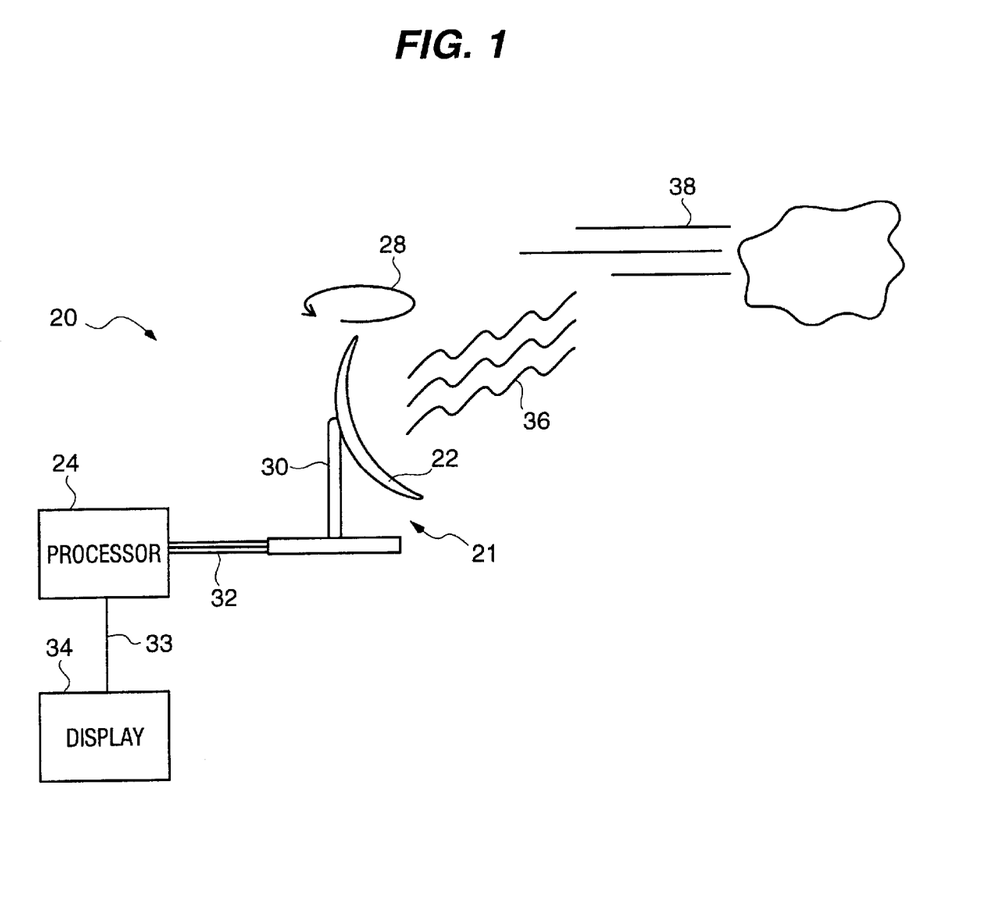
FIG. 1 illustrates a weather radar system in block diagram form.

Weather Radar System—FIG. 1

FIG. 1 illustrates the enhanced microburst detection system apparatus 20 of the present invention that includes a weather radar system 21. The weather radar system 21 includes a radar antenna 22, a processor 24 operatively connected to the radar antenna 22 by way of communication leads 32, and a display 34 operatively connected to the processor 24 by way of communication lead 33. Radar antenna 22 is a conventional radar transmission and detection apparatus that continuously rotates on an axis such as indicated by pathway 28 powered by drive mechanism 30. Weather radar system 21 is operationally well known in the art and readily available from multiple commercial manufacturers in the field. Weather radar system 21 is preferably a TDWR style apparatus. Exemplary weather radar systems may be purchased from any number of commercial suppliers including, but not limited to, Raytheon, Hughes Aircraft of Culver City, Calif.; or other commercial manufacturers.

Processor 24 can be configured to vary the beam width and gate sweep generated by radar antenna 22 because processor 24 governs the operation of weather radar system 21. Processor 24 is programmed with a special fuzzy logic processing code according to the present invention as disclosed below. Display 34 generates a graphical presentation of radar-derived information. Processor 24 is preferably provided with program modifications that enable the processor to conduct radar measurements with selectively varied azimuthal beam widths and gate spacings. The azimuth and gate spacing changes serve to vary the resolution of the enhanced microburst detection system apparatus 20.

In operation, weather radar system 21 emits radio signals 36 and, in turn, receives a corresponding reflection off of atmospheric structure 38 that are representative of a wind shear or related storm activity for example. The reflected signals are received by radar antenna 22, converted to electrical pulses or other representative signal, and transferred to processor 24 along communication leads 32. Processor 24 operates in a conventional manner to produce a radial wind velocity image, surface reflectivity image, and a clutter image.

Figure 2:
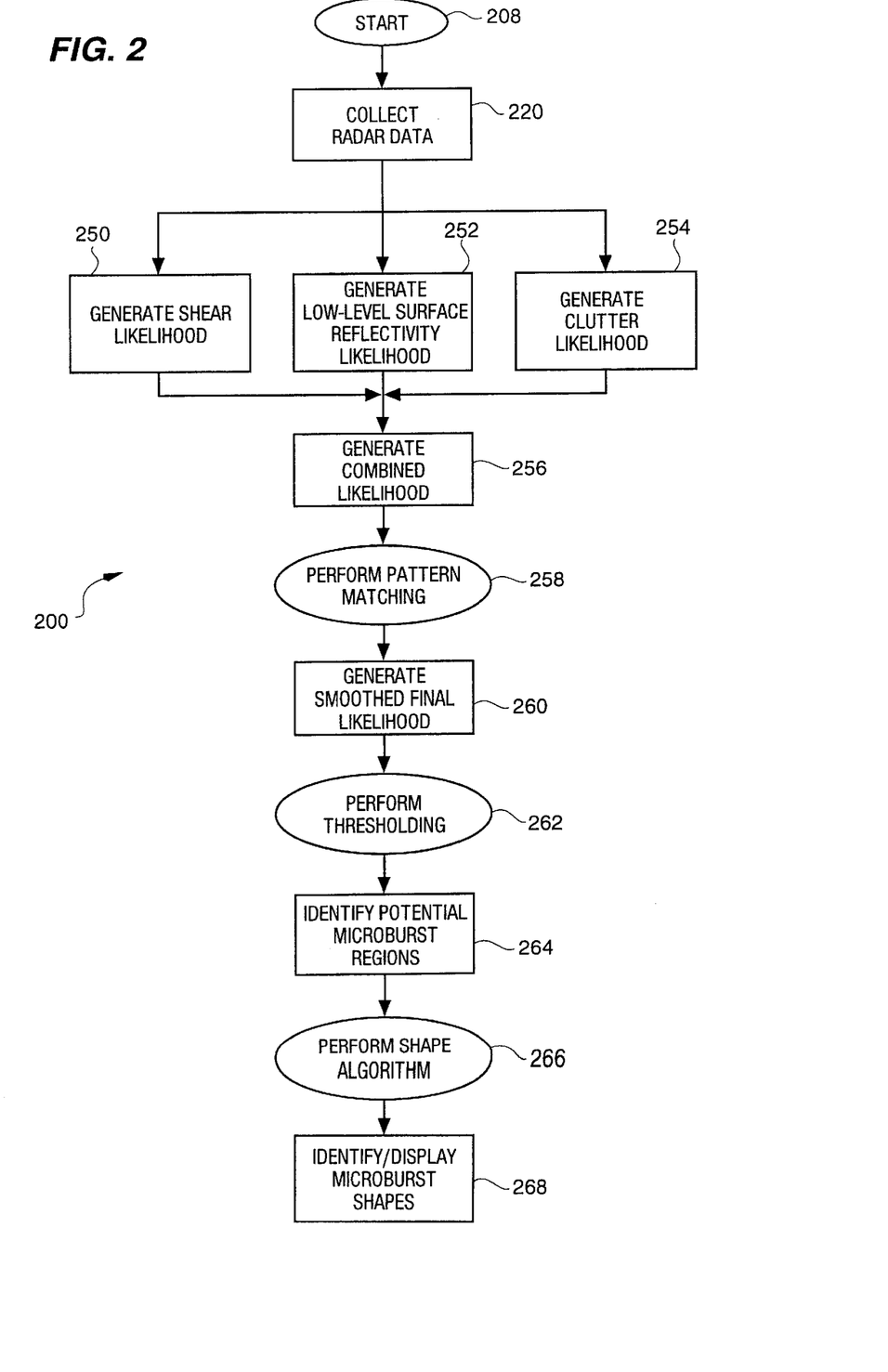
FIG. 2 illustrates the operational steps for an existing fuzzy logic based microburst detection system.

Original Microburst Detection System Operational Steps—FIG. 2

FIG. 2 illustrates the original microburst detection system operational steps 200 in flow diagram form. It is important to note that the operational steps 200 occur for each scan of the weather radar system 21. The operational steps 200 begin at step 208 and proceed to step 220 where the raw radar data is collected as previously disclosed. The raw radar data reflected from atmospheric structure 38 is converted into individual likelihood images at concurrent steps 250, 252, and 254 respectively. At step 250 a shear likelihood image is generated. At step 252 a low level surface reflectivity likelihood image is generated. At step 254 a clutter likelihood image is generated.

Generating a shear likelihood image at step 250 includes converting the radial velocity image of the signal that is reflected off of atmospheric structure 38 into a wind field shear likelihood image that indicates the likelihood of microburst activity based on the presence of wind shear. Wind shear locations are apparent as areas of radial velocity divergence or convergence in the radial velocity of the wind field. Estimates of the wind field shear are often proportional to the likelihood of a microburst. Radial wind velocity is a scalar function $u(r,\theta)$ determined at a distance r from the radar antenna 26 and at an angle $\theta$. The resolution of the radar measurements forces are measured quantities for a series of individual grid block elements of a polar coordinate grid. A wind field shear value is computed for each grid block element based on the velocities in the region proximate to each grid block element. The calculated wind field shear values are preferably applied to a likelihood function that is used to transform the wind field shear values into corresponding likelihood values ranging between –1 and 1. The resulting wind shear likelihood values are plotted to generate a wind field shear likelihood image at step 250.

Generating a low level surface reflectivity image at step 252 includes converting radar signals reflected from atmospheric structure that is present at low radar elevation angles of about or less than 1 degree even though the structure is not necessarily associated with storm activity. The likelihood mapping that associates reflectivity values with likelihood values assigns a 1.0 likelihood to high reflectivities, a 0.0 likelihood to low reflectivities, and intermediate values to intermediate reflectivities. Preferred definitions for high and low reflectivity are 40 dBZ and 20 dBZ respectively.

Generating a clutter likelihood image at step 254 includes distinguishing the fixed objects within the radar's range that can adversely impact the wind shear measurements. Fixed objects having a measured wind speed of zero can be embedded in an ambient wind field that can produce wind shear which is not caused by a meteorological event or other atmospheric structure. These false measurements can lead to faulty microburst detection also known as false alarms. The presence of clutter in radar data is indicated as a binary yes or no value for each grid position of a polar coordinate display and is typically available in the incoming radar data. A clutter likelihood function is used to generate a clutter likelihood image from the binary position indicators as a function of distance. Measurements that are obtained far from clutter are not effected by the clutter. Measurements obtained very near clutter are contaminated by the clutter. For example, false wind values are produced that are caused by the clutter, not by the true wind. The clutter likelihood function therefore assigns very negative likelihood to regions close to clutter, and 0.0 likelihood to regions far from clutter. The effect is that combined likelihood values are reduced in regions contaminated by clutter, while combined likelihood values are uneffected in regions free of clutter.

At step 256, a combined likelihood image is generated that is the combination of the likelihood images previously generated in concurrent steps 250, 252, and 254. Specifically, the likelihood image values at each grid location in each of the shear likelihood image, surface reflectivity likelihood image, and the clutter likelihood image, are the basis of a set of values that form the combined likelihood image of step 256. A combined additive weighting likelihood value is obtained at each grid block element by multiplying the coordinate-specific likelihood from each set of data by a weighting factor according to Equation 1 below:

$$L = W_s L_s + W_c L_c + W_r L_r \quad (1)$$

wherein L is the coordinate specific combined likelihood; $W_s$ is a weighting factor for the wind shear likelihood data set; $L_s$ is a coordinate-specific likelihood value for the wind shear likelihood data set; $W_c$ is a weighting factor for the clutter likelihood data set; $L_c$ is a coordinate-specific likelihood value for the clutter likelihood data set; $W_r$ is a weighting factor for the low level surface reflectivity likelihood data set; and $L_r$ is a coordinate-specific likelihood value for the low level surface reflectivity likelihood data set. The range of values for L are preferably truncated between −1 and 1.

The individual weighting factors $W_s$, $W_c$, and $W_r$ are carefully selected to optimize the incidence of L values equaling 1 and −1 in conformity with the event function t(k) according to Equation 2 below:

$$t(k) = \begin{matrix} 1 \rightarrow \text{event at } k \\ -1 \rightarrow \text{otherwise (no event)} \end{matrix} \quad (2)$$

wherein t(k) is the event function approximated by a given L likelihood with a value of 1 indicating an exact correlation to a microburst event and a value of −1 indicating an exact correlation to no microburst event; and k represents a coordinate where the event or non-event occurs. Weighting factor selection is preferably accomplished with conventional neural network training techniques, such as backward training techniques. Neural network training techniques are generally well known, and can be implemented from a variety of published articles and commercially available software. These weights can also be chosen by human experts with good performance in the model.

At step 258, the combined likelihood image of step 256 is scrutinized for pattern relationships that indicate an areal extent large enough for actual microburst activity. A microburst can be represented as a superposition of circles each having a certain minimum radius. A preferred radius for each circle is 1.5 km. The center of such a circle is positioned at the center of each spatial grid block element in a polar coordinate display. All of the grid block elements having a centroid that falls within the circle are averaged and the average value is assigned to the grid block element that underlies the center of the circle. The circle is moved to the next element, and the process is repeated averaging the original combined likelihood values from the combined likelihood image of step 256 until smoothed values have been obtained for all of the grid block elements.

At step 260, the pattern-matched and weighted calculation L value results are represented as a final smoothed likelihood image. The pattern matching of step 258 has smoothed the combined likelihood image of step 256 by eliminating most of the spurious small high likelihood anomalies while permitting the larger blocks having similarly high values to remain in the image. The pattern matching also removes spurious local points that are derived from fast moving targets such as aircraft.

At step 262, at least one threshold likelihood delimiter is applied to determine which regions of a final smoothed likelihood image are actually microbursts. A threshold likelihood value is compared to each of the grid coordinates on the final likelihood image. The threshold value is preferably a likelihood value L ranging from 0.3 to 0.5 when the combined likelihood ranges from −1 to 1, and is most preferably 0.5.

At step 264, regions of continuously connected grid elements having a combined likelihood greater than the threshold are identified. Any number of such regions can exist with varying sizes. In step 266, microburst shapes are defined as lines drawn around each connected group of elements having a likelihood value that exceed the threshold. The lines form respective polygonal closed boundaries. In step 268, the lines or shapes as identified are displayed through display 34 on a velocity image as microburst indicators. Shapes having a total area less than a minimum area delimiter are discarded as spurious readings. An area delimiter is preferably 1.5 km². Shapes having an overall radial length less than a minimum length delimiter are also discarded. The radial length delimiter is preferably 1.0 km.

Figure 3:
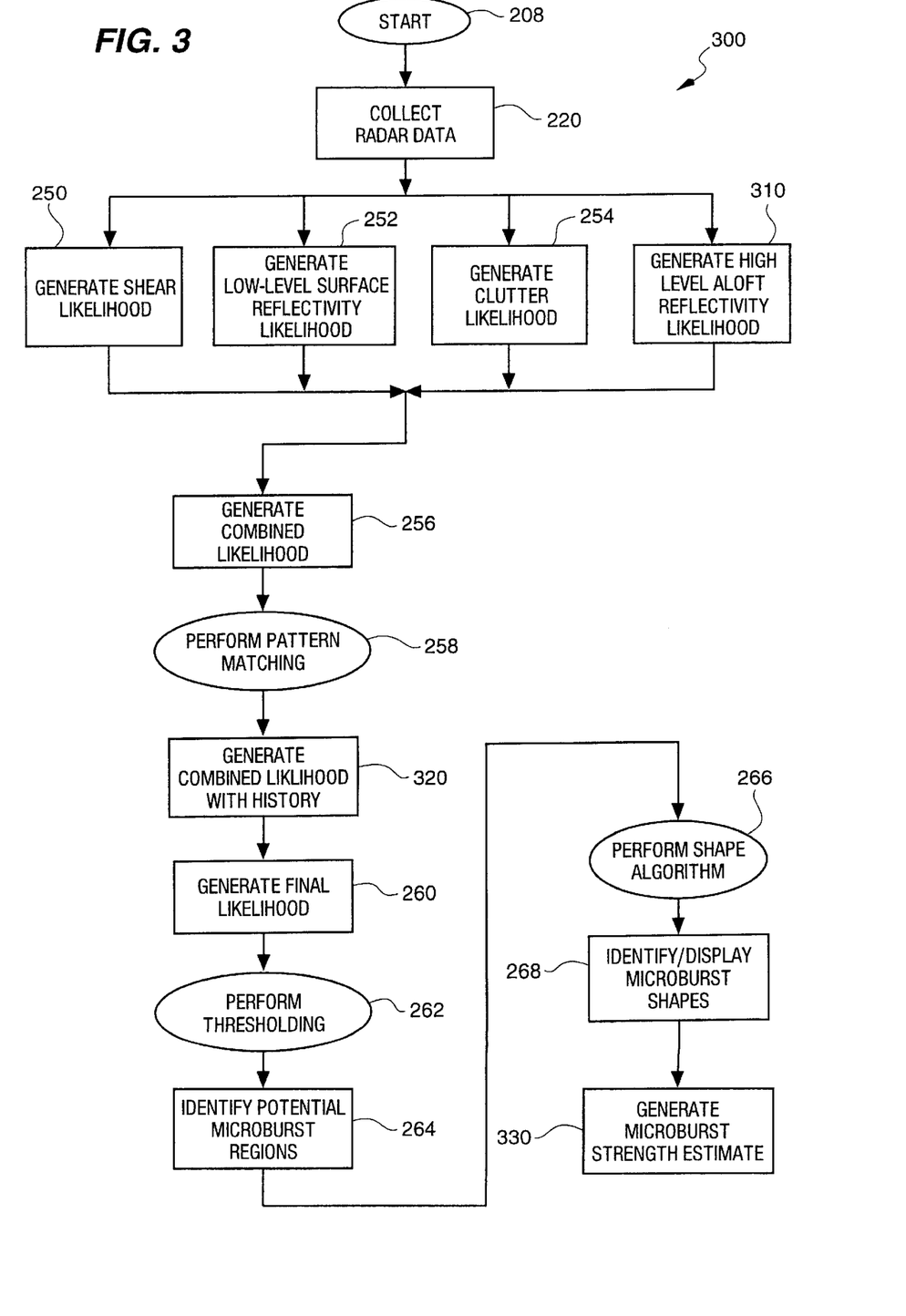
FIG. 3 illustrates the operational steps for an enhanced microburst detection system.
Figure 4:
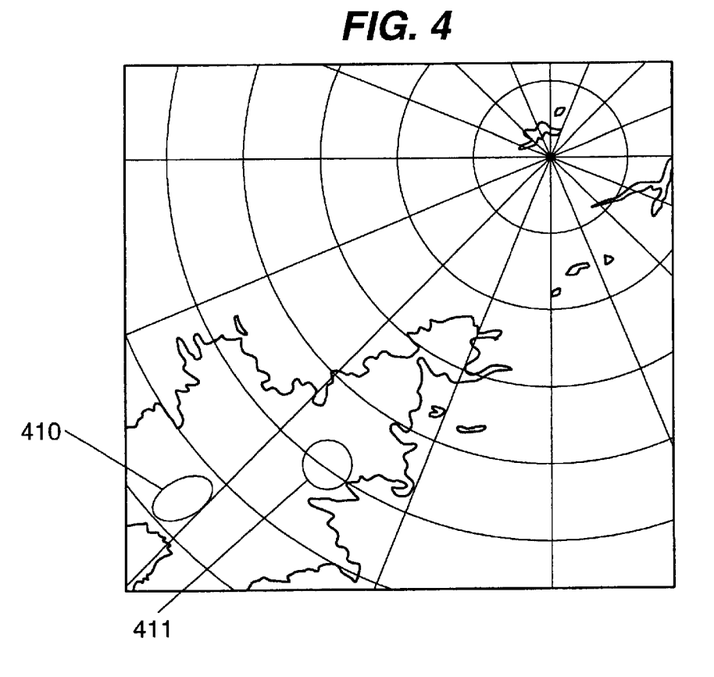
FIG. 4 illustrates a high level aloft reflectivity likelihood image in polar coordinate display form.
Figure 5:
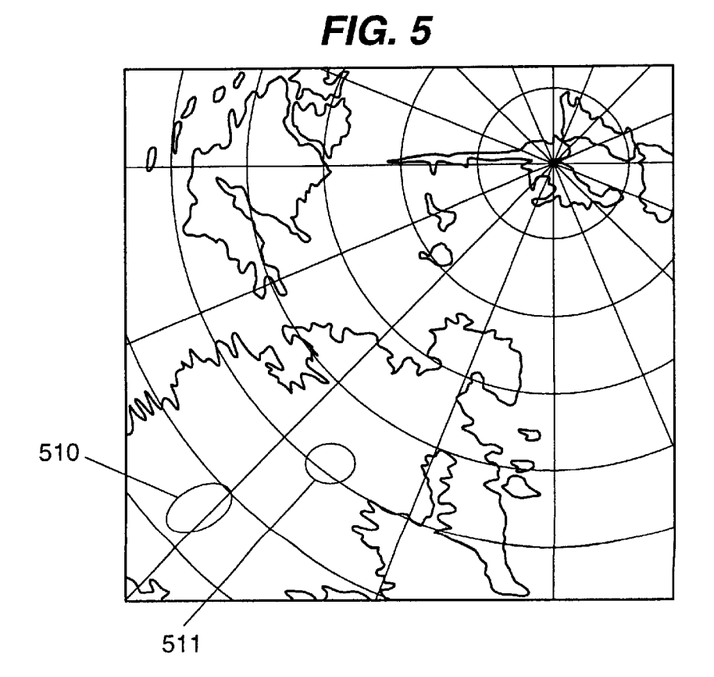
FIG. 5 illustrates a low level surface reflectivity likelihood image in polar coordinate display form.

Storm Aloft Microburst Detection System Enhancement—FIGS. 3–5

FIG. 3 illustrates the enhanced microburst detection system operational steps 300 in flow diagram form. The operational steps 300 include all of the original microburst detection system operational steps 200 previously disclosed in the text accompanying FIG. 2, in addition to step 310 that is one subject of the present invention as disclosed in the text accompanying the enhanced microburst detection system operational steps 300 of FIG. 3. Step 310 discloses the high elevation aloft reflectivity likelihood enhancement of the present invention. FIGS. 4 and 5 illustrate high elevation aloft reflectivity and low level surface reflectivity likelihood images respectively.

Step 310 illustrates an additional storm aloft reflectivity likelihood input to the combined likelihood generation step 256. The high level aloft reflectivity likelihood 310 is revealed by high reflectivity of about 25 dBZ or greater from high altitude storms that are typically accompanied by a descending core of cold air in the region at or about 3 to 6 km above the Earth's surface. The presence of a storm aloft as indicated by such reflectivities is valuable likelihood information that can significantly enhance the prediction and/or identification of a microburst, whether or not surface precipitation is present, just prior to or as much as 5 minutes prior to the occurrence of a microburst. Storms aloft are detected by a high elevation radar scan that views the 3 to 6 km region of the atmosphere by way of a user adjustable elevation angle parameter from about 1 to 6 degrees. The reflectivity image from a high elevation radar scan taken at an aloft angle is transformed to an aloft storm likelihood in the same manner as the low level surface reflectivity was transformed. The likelihood mapping that associates reflectivity values with likelihood values assigns a 1.0 likelihood to high reflectivities, a 0.0 likelihood to low reflectivities, and intermediate values to intermediate reflectivities. Preferred definitions for high and low reflectivity are 40 dBZ and 20 dBZ respectively. The presence of storms aloft can therefore be considered as additional circumstantial evidence in favor of the likelihood of microbursts and can be combined with the previously disclosed likelihood images to form a more complete combined likelihood image at step 256.

The weighted value for the storm aloft or high level reflectivity likelihood is also used in a similar manner as for the low level surface reflectivity. That is, the likelihood images for the shear, clutter, surface reflectivity, and aloft reflectivity are combined using a pointwise weighted summation and then truncated at 1 and −1. At each grid point the combined likelihood L of the respective shear likelihood $L_s$, clutter likelihood $L_c$, surface reflectivity likelihood $L_{sr}$, and aloft reflectivity likelihood $L_{ar}$, using weight factors $W_s$, $W_c$, $W_{sr}$, and $W_{ar}$, is defined as:

$$L = W_s L_s + W_c L_c + W_{sr} L_{sr} + W_a L_{ar} \tag{3}$$

In one preferred embodiment, the weighted values used were $W_s=0.9$, $W_c=0.4$, $W_{sr}=0.1$, and $W_{ar}=0.1$.

FIG. 4 illustrates a high elevation aloft reflectivity likelihood image 400. The aloft reflectivity likelihood image 400 is an example of a well defined storm as viewed at an elevation angle of 5.5 degrees. Two regions 410 and 411 of the displayed storm are producing microbursts.

FIG. 5 illustrates a low level surface reflectivity likelihood image 500. The surface reflectivity likelihood image 500 is the corresponding low level surface view of the same storm displayed in FIG. 4. The storm is less localized in the lower elevation view, in the present example a 0.5 elevational angle, so that determining a microburst likelihood is more difficult without the reenforcement of the high elevation aloft reflectivity likelihood image 400. Two regions 510 and 511 of the displayed storm are producing microbursts and are confirmed by the corresponding overlay of regions 410 and 411 from FIG. 4.

Figure 6:
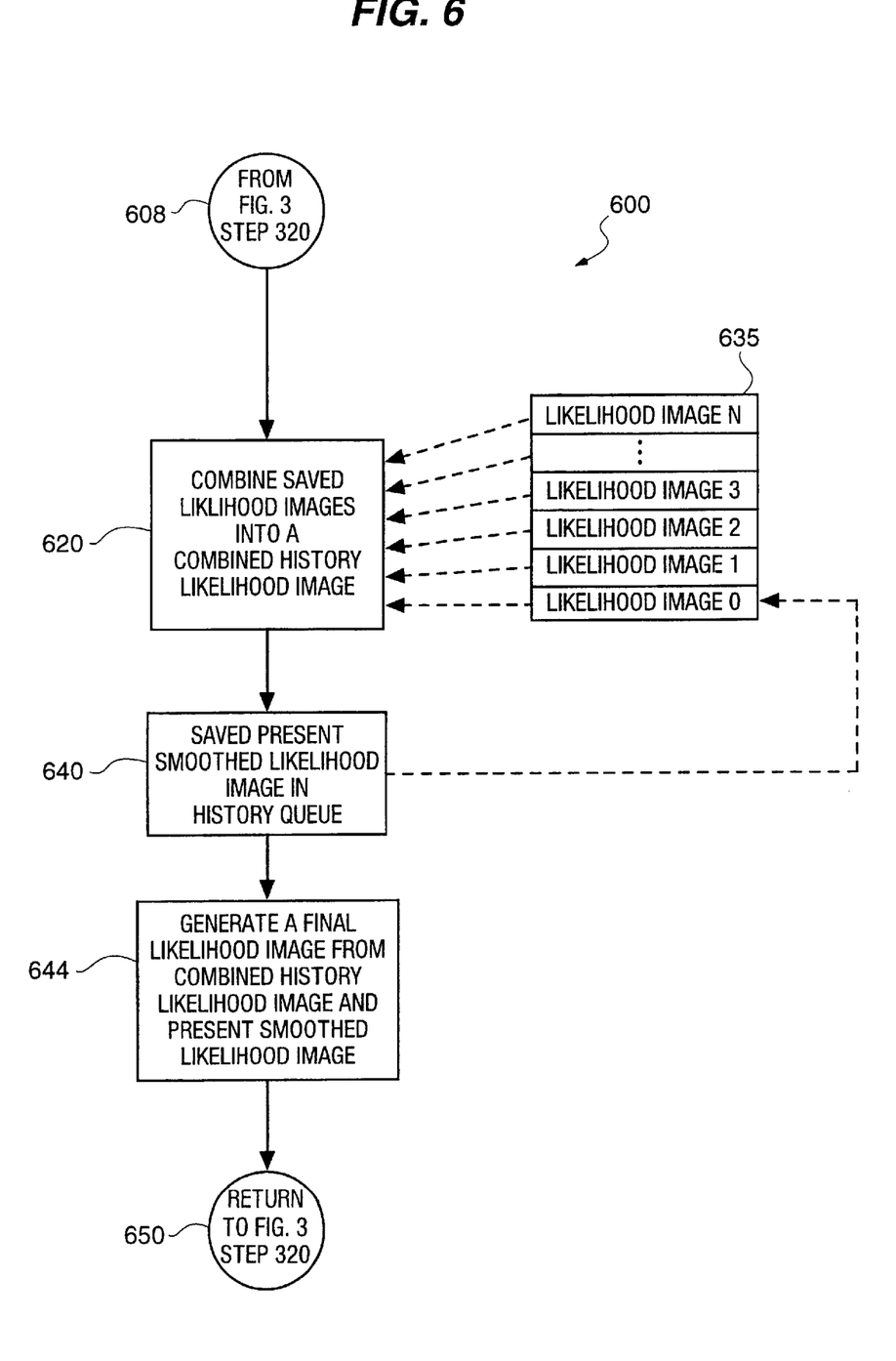
FIG. 6 illustrates the details of generating a history likelihood image in flow diagram form.

History Likelihood Microburst Detection System Enhancement—FIGS. 3 & 6

FIG. 3 illustrates the enhanced microburst detection system operational steps 300 in flow diagram form. The operational steps 300 include all of the original microburst detection system operational steps 200 previously disclosed in the text accompanying FIG. 2, in addition to the history likelihood generating step 320 that is one subject of the present invention enhancement as disclosed in the text accompanying the enhanced microburst detection system operational steps 300 of FIG. 3. The text accompanying FIG. 6 illustrates the details of step 320 from FIG. 3.

Microbursts persist over time scales longer than the one minute scale that is typical of radar scans. Thus, if a microburst has been occurring near a location in the recent past, it is more likely a microburst will occur again at or near that same location in the time frame of future radar scans of the region. For this reason, generating and including a history likelihood image into a final combined likelihood image provides valuable confidence between present microbursts and the likelihood of future microbursts in a localized region.

Generating a history likelihood image is illustrated in the operational steps 600 that begin with step 608. At step 620, a history likelihood image is generated by combining a set of smoothed likelihood image from history queue 635 into a single history likelihood image $L_H$. The set of smoothed likelihoods is a first in first out style queue of size N that contains a smoothed likelihood image for each scan of weather radar system 21. When a new likelihood image is saved in the queue, the oldest likelihood image is pushed out of the queue. The present smoothed likelihood image L is saved as the newest likelihood image in the history queue 635 at step 640 after the history likelihood image $L_H$ has been generated for the present radar scan. Specifically, the history likelihood image $L_H$ for a polar coordinate position (r, θ) is generated for a history queue of length N by way of Equation 4 below.

$$L_H(r, \theta) = \sum_{k=0}^{N-1} w(k) \cdot L_k(r, \theta) \tag{4}$$

where w(k) is a weight value assigned to the smoothed likelihood image $L_k$ of time increment k. Where k=0 is the most recent, k=1 is the next most recent, and k=N is the oldest image. For simplicity in one preferred embodiment, the values w(k) are assumed to drop off linearly from a maximum at k=0 to a value of 0.0 at k=N, and the sum of the weights equals 1.0 as illustrated in Equation 5 below.

$$\sum_{k=0}^{N} w(k) = 1.0 \tag{5}$$

The above constraints on w(k) lead to assigned weights that satisfy Equation 6 below.

$$w(k) = \frac{2 \cdot (N - k)}{(N + 1) \cdot N} \tag{6}$$

For example, assume that N>0 and weights w(k), k−0,1, . . . , N, are defined as stated in Equation 7 below $$\sum_{k=0}^{N} w(k) = 1.0 \tag{7}$$

such that w(k) is a linear function of k for which w(N)=0.0. The linearity assumption allows us to write $$w(k) = \frac{(0 - w(0))}{(N - 0)} \cdot k + w(0) \tag{8}$$

which when put into Equation 7 gives $$\sum_{k=0}^{N} w(k) = \frac{-w(0)}{N} \cdot (0 + 1 + \ldots + N) + (N + 1)w(0) \tag{9}$$

But $$(1 + 2 + \ldots + N) = \frac{(N + 1) \cdot N}{2} \tag{10}$$

Combining Equations 7, 9, and 10 gives $$\frac{w(0) \cdot (N + 1)}{2} = 1.0 \tag{11}$$

or $$w(0) = \frac{2}{(N + 1)} \tag{12}$$

Substituting back into Equation 8 gives $$w(k) + \frac{-2}{(N + 1) \cdot N} \cdot k + \frac{2}{(N + 1)} = \frac{2 \cdot (N - k)}{(N + 1) \cdot N} \tag{13}$$

At step 644, a final likelihood image $L_F$ is generated from combining the history likelihood image $L_H$ with the present smoothed likelihood image L using a combining weight W by way of Equation 14 below.

$$L_F(r, \theta) = W \cdot L_H(r, \theta) + (1.0 - W) \cdot L(r, \theta) \quad (14)$$

The final likelihood image $L_F$ is used as the likelihood image for thresholding into shapes indicative of microbursts. Note that setting W=0.0 passes through the smoothed image L with no contribution from $L_H$. At step 650, processing returns to FIG. 3 to proceed as previously disclosed.

As expected with the introduction of a history likelihood, the enhanced microburst detection system of the present invention can suppress the beginning of a microburst detection for one or two scans of the weather radar system 21. This suppression has the perceived effect of delaying valid detections, however, the greater positive effect is that an initial detection must persist through more than one radar scan for the weighted likelihood to increase to a high enough level to trigger a detection. Thus, false flicker detections are eliminated by introducing the history likelihood.

Figure 7:
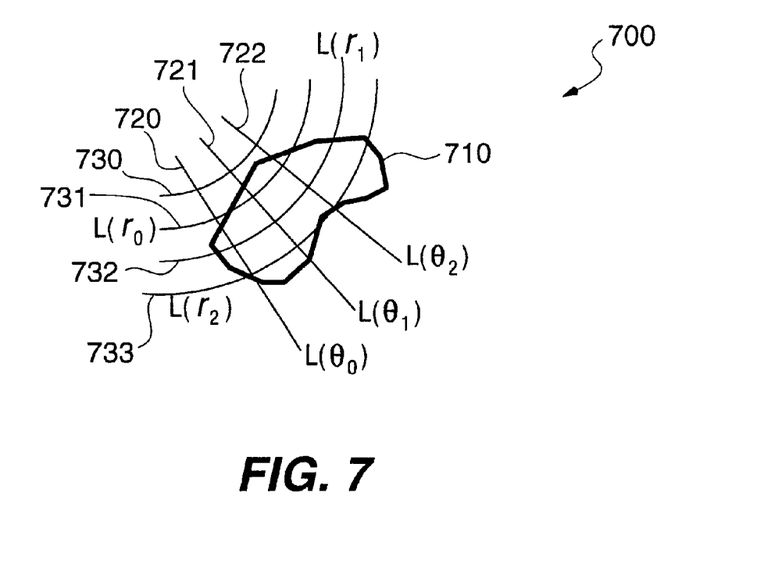
FIG. 7 illustrates a microburst strength grid in polar coordinate display form used to generate a microburst strength estimate.
Figure 8:
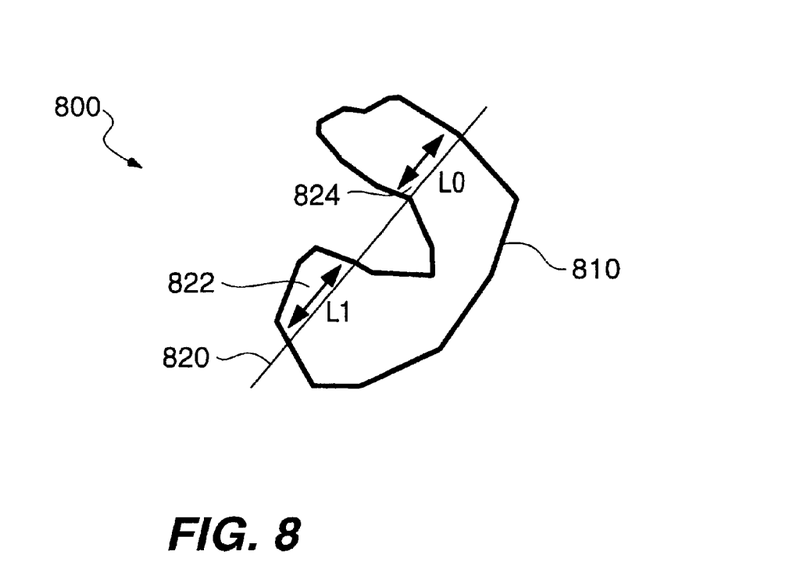
FIG. 8 illustrates a simplified microburst strength grid in polar coordinate form for a concave microburst shape.

Microburst Strength Assessment Enhancement—FIGS. 3. and 7–8

Once a microburst has been identified at step 268 of FIG. 3, an estimate of the microburst's strength can be generated at step 330. Generating an estimate of a microburst's strength is a valuable parameter that was not available prior to the present invention and can be used to determine the level of warning given to aircraft proximate to or presently encountering a microburst.

In a preferred embodiment, the measure of a microburst's strength is the wind speed loss that an aircraft would experience when flying through the microburst. However, because an infinite number of paths exist through a two-dimensional shape of a microburst, only the paths along radial orientations and azimuthal arc orientations of the polar coordinate display are analyzed.

FIG. 7 illustrates a microburst strength grid 700 used to generate a microburst strength estimate. The microburst shape 710, commonly referred to as the "shape", is illustrated as the traditional dark bold polygon outline of an actual microburst. Individual wind speed loss estimates are computed along radial (720–722) and azimuthal (730–733) paths through the shape, using the computed radial shear estimates $u_r(r,\theta)$ at each of the grid locations $(r,\theta)$ interior to the shape. Because shear has units of meters per second per meter, or inverse seconds, the numerical integration is simply the sum of the shears across each gridpoint in the polar coordinate display interior to the shape multiplied by the distance across the gridpoint.

For radial paths 720–722, the distance across a grid box in the polar coordinate display is the gate spacing, so that the loss $L(\theta_0)$ along path 720, for example, is given by Equation 15 below:

$$L(\theta_0) = u_r(r_0,\theta_0) \cdot \Delta r + u_r(r_1,\theta_0) \cdot \Delta r + u_r(r_2,\theta_0) \cdot \Delta r \quad (15)$$

and similarly along path 721 the loss is given by Equation 16 below:

$$L(\theta_1) = u_r(r_0,\theta_1) \cdot \Delta r + u_r(r_1,\theta_1) \cdot \Delta r + u_r(r_2,\theta_1) \cdot \Delta r \quad (16)$$

and for a general microburst shape that is intersected by a radial beam oriented in azimuthal-direction theta at radial grid locations $r(k)$, $k=0,1,\ldots N-1$, the loss estimate is given by Equation 17 below:

$$L(\theta) = \sum_{k=0}^{N-1} u_r(r(k), \theta) \cdot \Delta r \quad (17)$$

For azimuthal paths 730–733, the distance across a grid box in the polar coordinate display is the arc length $r \cdot \Delta\theta(\theta)$, with possible unequal azimuthal spacing between beams. The loss $L(r_0)$ and $L(r_1)$ along paths 730 and 731 are therefore given by Equations 18 and 19 below:

$$L(r_0) = u_r(r_0, \theta_0) \cdot ((r_0 \cdot \Delta\theta\ (\theta_0))) + \quad (18)$$
$$u_r(r_0, \theta_1) \cdot ((r_0 \cdot \Delta\theta\ (\theta_1))) +$$
$$u_r(r_0, \theta_2) \cdot ((r_0 \cdot \Delta\theta\ (\theta_2)))$$

and $$L(r_1) = u_r(r_1, \theta_0) \cdot ((r_1 \cdot \Delta\theta\ (\theta_0))) + \quad (19)$$
$$u_r(r_1, \theta_1) \cdot ((r_1 \cdot \Delta\theta\ (\theta_1))) +$$
$$u_r(r_1, \theta_2) \cdot ((r_1 \cdot \Delta\theta\ (\theta_2)))$$

a general microburst shape that is intersected by an azimuthal path at distance r from the radar at azimuthal grid locations $\theta_{(j)}$, $j=0,1,\ldots M-1$ the loss estimate is given by Equation 20 below:

$$L(r) = \sum_{j=0}^{M-1} u_r(r, \theta(j)) \cdot r \cdot \Delta\theta(\theta(j)) \quad (20)$$

A general microburst shape has extent azimuthally from $\theta_0$ to $\theta_1$ and radially from $R_0$ to $R_1$, leading to the set of loss estimates given by Equation 21 below:

$$L = \{L(r)|r=R_0, \ldots R_1\} \cup \{L(\theta)|\theta=\Theta_0, \ldots \Theta_1\} \quad (21)$$

and then the loss estimate for the shape can be derived from the set L. Because the radial shear estimates tend to underestimate the true shear in a microburst (radial shear is less than the maximum shear), the maximum over L was chosen as the estimate of the loss given by Equation 22 below.

$$\text{Loss} = \max(L = \{L(r)|r=R_0, \ldots, R_1\} \cup \{L(\theta)|\theta=\Theta_0, \ldots \Theta_1\}) \quad (22)$$

Generating microburst strength estimates as disclosed up to this point in the discussion, assumes that the shape 710 is concave. In other words, each path 720–722 and 730–733 through shape 710 is entirely contained within shape 710. However, for shapes that are convex or that have holes in them, each path through the shape must be generalized as a sequence of subpaths where each subpath has a wind speed loss estimate and the total loss estimate along the path is the sum of the loss estimates for each subpath.

FIG. 8 illustrates a simplified microburst strength grid 800 for a concave microburst shape 810 used to generate a microburst strength estimate. The path 820 through shape 810 enters and exits shape 810 twice thereby requiring two wind speed loss estimates for subpaths L0 and L1 indicated by reference numbers 822 and 824 respectively. The wind speed loss estimate for each subpath 822 and 824 is generated in the same manner as previously disclosed for any individual radial or azimuthal path. The total wind speed loss estimate L for the entire path 820 is determined by L=L0+L1.

Summary

The enhanced microburst detection system of the present invention includes a high elevation aloft reflectivity likelihood as an additional likelihood element to further improve the accuracy of microburst detection, a history likelihood as an additional likelihood element to eliminate flickers and otherwise false readings from one radar scan to the next, and a microburst strength determination that is based on the wind speed loss that an aircraft would experience when flying through a microburst. Those skilled in the art will understand that the preferred embodiments described hereinabove may be subjected to apparent modifications without departing from the scope and spirit of the invention. The inventors, accordingly, hereby state their intention to rely upon the Doctrine of Equivalents, in order to protect their full rights in the invention.

I claim:

1. A method for identifying a presence and locus of wind shear in a predefined area, said method comprising:

generating a first set of data (250, 252, 254) indicative of said wind shear by way of a low level surface radar scan from a weather radar system (21);

generating a second set of data (310) indicative of a storm aloft by way of a high level radar scan from said weather radar system (21);

converting said first set of data (250, 252, 254) and said second set of data (310) from said weather radar system into a quantified likelihood image (256) of said presence and locus of said wind shear;

accumulating said quantified likelihood image (256) in a likelihood image history (635);

generating a historic likelihood image (620) from said likelihood image history (635); and generating a final likelihood image (644) from said quantified likelihood image (256) and said historic likelihood image (620).

2. A method according to claim 1 wherein said step of generating said first set of data (250, 252, 254) includes:

transmitting a radio signal (36) from a weather radar system (21) at a low elevation;

receiving an echo (38) of said radio signal (36) off meteorologically significant structure within range of said weather radar system (21); and translating said echo (38) into at least one of a type of likelihood image selected from a group consisting of: radial velocity of a point in a wind field (250), clutter (254), and surface reflectivity (252).

3. A method according to claim 1 wherein said step of generating said second set of data (310) includes:

transmitting a radio signal (36) from a weather radar system (21) at an adjustable high elevation; receiving an echo (38) of said radio signal (36) off meteorologically significant structure within range of said weather radar system (21); and translating said echo into an aloft reflectivity likelihood image (310).

4. A method according to claim 1 wherein said step of converting includes:

generating a plurality of likelihood images (250, 252, 254, 310) from said first set of data (250, 254, 252) and said second set of data (310);

applying at least one likelihood value to each of said plurality of likelihood images selected from a group consisting of: wind field shear (250), clutter (254), surface reflectivity (252), and aloft reflectivity (310), wherein each of said at least one likelihood value are selected according to at least one threshold delimiter characteristic (262) of said wind shear;

applying a weighting factor to each said likelihood value; and generating a combined likelihood image (256) based on said plurality of likelihood images (250, 252, 254, 310).

5. A method according to claim 4 wherein said step of generating at least one likelihood image includes:

calculating a wind field shear likelihood image (250) from a two-dimensional least squares calculation that includes azimuthal and angular components of a radial wind velocity.

6. A method according to claim 4 wherein said step of generating a combined likelihood image includes:

smoothing (262) spatial components of a plurality of said likelihood values across said combined ed likelihood image (256) to reject any of said likelihood values that fail to satisfy said threshold delimiters;

clumping (264) connected regions of a plurality of likelihood images where at least one said likelihood value in each of said connected regions satisfies said threshold delimiter; and identifying (268) a clumped set of said plurality of likelihood images having connected regions therebetween as an indicator of said presence and locus of said wind shear.

7. A method according to claim 1 including:

generating a wind speed strength quantification (350) of said wind shear based on an amount of wind speed loss of an aircraft that encounters said wind shear.

8. A computer-readable storage device containing instructions for controlling a computer system (24) to perform the steps according to claim 1.

9. A system for identifying a presence and locus of wind shear in a predefined area, said system comprising:

means (24) for generating a first set of data (250, 252, 254) indicative of said wind shear by way of a low level surface radar scan from a weather radar system (21);

means (24) for generating a second set of data (310) indicative of a storm aloft by way of a high level radar scan from said weather radar system (21);

means (24) for converting said first set of data (250, 252, 254) and said second set of data (310) from said weather radar system into a quantified likelihood image (256) of said presence and locus of said wind shear;

means (24) for accumulating said quantified likelihood image (256) in a likelihood image history (635);

means (24) for generating a historic likelihood image (620) from said likelihood image history (635); and means (24) for generating a final likelihood image (644) from said quantified likelihood image (256) and said historic likelihood image (620).

10. A system according to claim 9 wherein said means (24) for generating said first set of data (250, 252, 254) includes:

means (22) for transmitting a radio signal (36) from a weather radar system (21) at a low elevation;

means (22) for receiving an echo (38) of said radio signal (36) off meteorologically significant structure within range of said weather radar system (21); and means (24) for translating said echo (38) into at least one of a type of likelihood image selected from a group consisting of: radial velocity of a point in a wind field (250), clutter (254), and surface reflectivity (252).

11. A system according to claim 9 wherein said means (24) for generating said second set of data (310) includes:

means (22) for transmitting a radio signal (36) from a weather radar system (21) at an adjustable high elevation;

means (22) for receiving an echo (38) of said radio signal (36) off meteorologically significant structure within range of said weather radar system (21); and means (24) for translating said echo into an aloft reflectivity likelihood image (310).

12. A system according to claim 9 wherein said means (24) for converting includes:

means (24) for generating a plurality of likelihood images (250, 252, 254, 310) from said first set of data (250, 252, 254) and said second set of data (310);

means (24) for applying at least one likelihood value to each of said plurality of likelihood images selected from a group consisting of: wind field shear (250), clutter (254), surface reflectivity (252), and aloft reflectivity (310), wherein each of said at least one likelihood value are selected according to at least one threshold delimiter characteristic (262) of said wind shear;

means (24) for applying a weighting factor to each said likelihood value; and means (24) for generating a combined likelihood image (256) based on said plurality of likelihood images (250, 252, 254, 310).

13. A system according to claim 12 wherein said means (24) for generating at least one likelihood image includes:

means for calculating a wind field shear likelihood image (250) from a two-dimensional least squares calculation that includes azimuthal and angular components of a radial wind velocity.

14. A system according to claim 12 wherein said means (24) for generating a combined likelihood image includes:

means (24) for smoothing (262) spatial components of a plurality of said likelihood values across said combined likelihood image (256), to reject any of said likelihood values that fail to satisfy said threshold delimiters;

means (24) for clumping (264) connected regions of a plurality of likelihood images where at least one said likelihood value in each of said connected regions satisfies said threshold delimiter; and means (24) for identifying (268) a clumped set of said plurality of likelihood images having connected regions therebetween as an indicator of said presence and locus of said wind shear.

15. A system according to claim 9 including:

means (24) for generating a wind speed strength quantification (350) of said wind shear based on an amount of wind speed loss of an aircraft that encounters said wind shear.

16. A computer readable medium containing computer executable instructions to perform a method for identifying a presence and locus of wind shear having predefined threshold delimiters for spatial and temporal characteristics, said method comprising:

generating data (220) indicative of said wind shear using a weather radar system;

converting said data from said weather radar system into a plurality of likelihood images selected from a group comprised of: wind field shear (250), clutter (254), surface reflectivity (252), and aloft reflectivity (310);

assigning at least one likelihood value to each of said plurality of likelihood images;

applying a weighting factor to each of said at least one likelihood value for each of said plurality of likelihood images, wherein each of said at least one likelihood value is accepted and rejected as characteristic of said wind shear based on said predefined threshold delimiters (262);

generating a combined likelihood (256) indicative of said wind shear based on said plurality of likelihood images (250, 252, 254, 310);

accumulating a plurality of combined likelihoods (635) over time;

combining said plurality of combined likelihoods (635) into a history likelihood (620); and generating a final likelihood (644) based on said combined likelihood (256) and said history likelihood (620).

17. A method according to claim 16 including:

generating a wind speed strength quantification (350) of said wind shear based on an amount of wind speed loss of an aircraft that encounters said wind shear.

18. A computer-readable storage device containing instructions for controlling a computer system (24) to perform the steps according to claim 17.

\* \* \* \* \*